United States Patent
Jayawardena et al.

(10) Patent No.: US 8,844,018 B2
(45) Date of Patent: Sep. 23, 2014

(54) METHODS AND APPARATUS TO ENHANCE SECURITY IN RESIDENTIAL NETWORKS

(75) Inventors: Thusitha Jayawardena, Holmdel, NJ (US); Gustavo De Los Reyes, Fair Haven, NJ (US); Gang Xu, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1193 days.

(21) Appl. No.: 12/338,614

(22) Filed: Dec. 18, 2008

(65) Prior Publication Data

US 2010/0162378 A1 Jun. 24, 2010

(51) Int. Cl.
 G06F 17/00 (2006.01)
 H04L 29/08 (2006.01)

(52) U.S. Cl.
 CPC ........ *H04L 67/2814* (2013.01); *H01L 63/0227* (2013.01)
 USPC .................. 726/12; 726/13; 726/14; 726/15; 713/153; 713/154; 709/223; 709/229

(58) Field of Classification Search
 USPC ........ 726/12–15; 713/153, 154; 709/223, 229
 See application file for complete search history.

(56) References Cited

U.S. PATENT DOCUMENTS

| | | | |
|---|---|---|---|
| 6,272,553 B2 | 8/2001 | Way et al. | |
| 6,434,618 B1 * | 8/2002 | Cohen et al. | 709/228 |
| 6,584,096 B1 | 6/2003 | Allan | |
| 7,028,337 B2 | 4/2006 | Murakawa | |
| 7,131,141 B1 * | 10/2006 | Blewett et al. | 726/12 |
| 7,949,039 B2 * | 5/2011 | Miller et al. | 375/224 |
| 2003/0233452 A1 * | 12/2003 | Maufer et al. | 709/225 |
| 2004/0090971 A1 | 5/2004 | Anderson, IV | |
| 2004/0148439 A1 | 7/2004 | Harvey et al. | |
| 2005/0053222 A1 | 3/2005 | Lee et al. | |
| 2005/0060759 A1 * | 3/2005 | Rowe et al. | 725/143 |
| 2006/0209857 A1 | 9/2006 | Hicks, III | |
| 2006/0236388 A1 | 10/2006 | Ying et al. | |
| 2007/0041554 A1 * | 2/2007 | Newman et al. | 379/218.01 |
| 2007/0058606 A1 | 3/2007 | Koskelainen | |
| 2007/0094709 A1 * | 4/2007 | Hsu | 726/2 |
| 2007/0127506 A1 | 6/2007 | Absillis | |
| 2008/0031151 A1 | 2/2008 | Williams | |
| 2008/0049920 A1 * | 2/2008 | Napoleoni et al. | 379/201.12 |
| 2008/0056240 A1 | 3/2008 | Ellis et al. | |
| 2008/0117902 A1 * | 5/2008 | Vinneras | 370/389 |
| 2008/0117923 A1 | 5/2008 | Otte | |
| 2008/0137549 A1 | 6/2008 | Manthoulis | |
| 2008/0144642 A1 | 6/2008 | Song | |
| 2009/0165067 A1 * | 6/2009 | Bruckman et al. | 725/110 |

* cited by examiner

*Primary Examiner* — Mohammad A Siddiqi
(74) *Attorney, Agent, or Firm* — Hanley, Flight & Zimmerman, LLC

(57) ABSTRACT

Example methods and apparatus to enhance security in residential networks and residential gateways are disclosed. A disclosed example apparatus includes a transceiver to receive an Internet protocol (IP) packet, a first packet processing module associated with a protected IP address, the first packet processing module to be communicatively coupled to a first network device, a second packet processing module associated with a public IP address, the second packet processing module to be communicatively coupled to a second network device, and a packet diverter to route the received IP packet to the first packet processing module when the IP packet contains the protected IP address and to route the IP packet to the second packet processing module when the IP packet does not contain the protected IP address.

19 Claims, 8 Drawing Sheets

METHODS AND APPARATUS TO ENHANCE SECURITY IN RESIDENTIAL NETWORKS

FIELD OF THE DISCLOSURE

The present disclosure relates generally to residential networks, and more particularly, to methods and apparatus to enhance security in residential networks.

BACKGROUND

In recent years, service providers have begun providing "triple-play" services that include voice (e.g., a telephone service), data (e.g., an Internet access service), and video (e.g., a television service). A service provider may provide triple-play services to a subscriber via any number and/or type(s) of access network(s), device(s) and/or technology(-ies), such as a public switched telephone network (PSTN), a gigabit passive optical network (GPON), a coaxial cable-based network, a satellite system, a wireless system and/or a public land mobile network (PLMN).

Service providers deliver and/or provide triple-play services to a subscriber via any number and/or type(s) of customer premises equipment (CPE) devices located at the subscriber's customer premises. Example CPE devices include, but are not limited to, a very high speed digital subscriber line (VDSL) modem, a cable modem, and an optical terminal. The CPE devices distribute data received from the service provider within the subscriber's customer premises.

DETAILED DESCRIPTION

Figure 1:
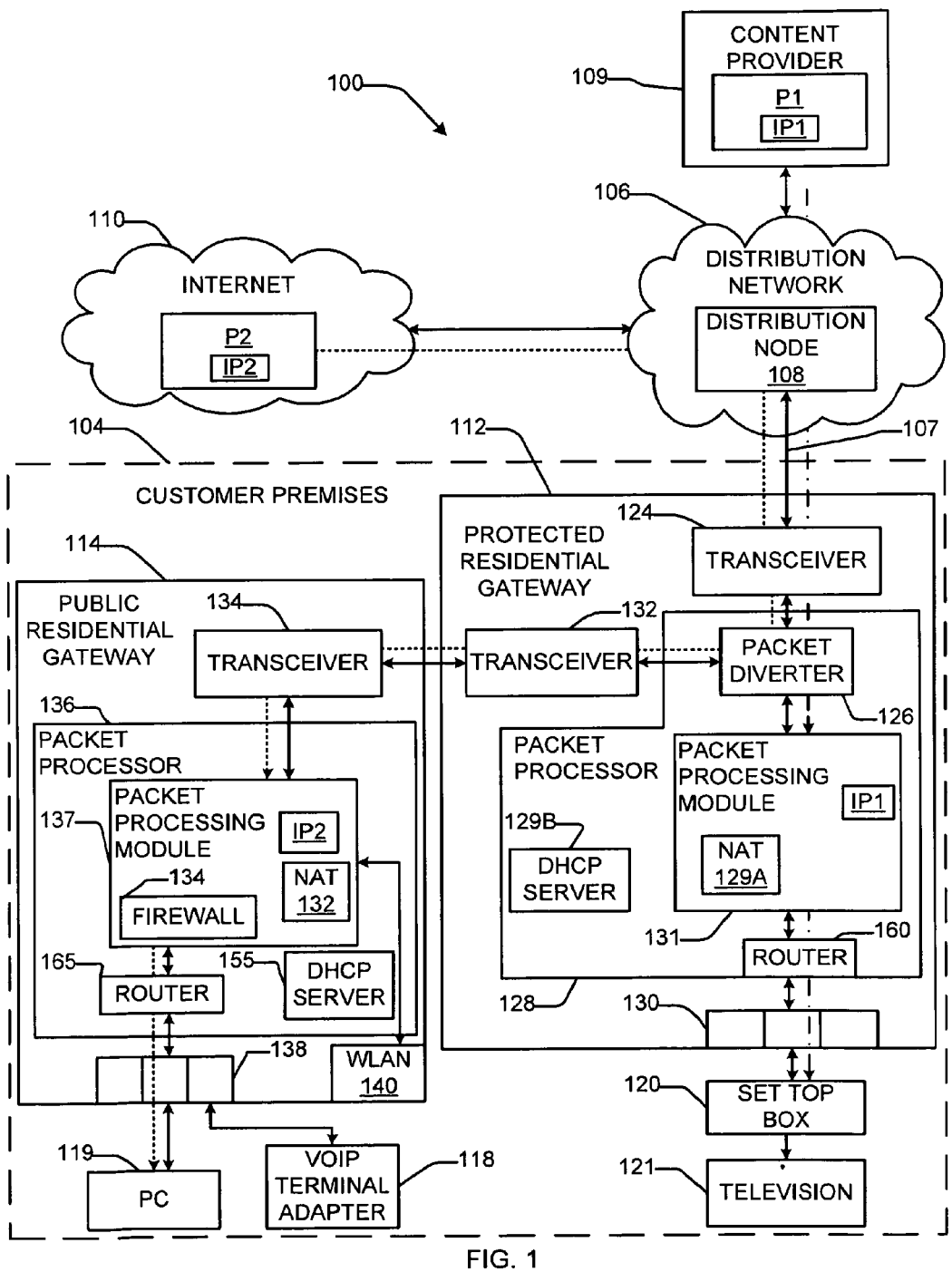
FIGS. 1 and 2 illustrate example enhanced security residential networks constructed in accordance with the teachings of this disclosure.

Example methods and apparatus to enhance security in residential networks are disclosed. A disclosed example apparatus includes a transceiver to receive an Internet protocol (IP) packet, a first packet processing module associated with a protected IP address, the first packet processing module to be communicatively coupled to a first network device, a second packet processing module associated with a public IP address, the second packet processing module to be communicatively coupled to a second network device, and a packet diverter to route the received IP packet to the first packet processing module when the IP packet contains the protected IP address and to route the IP packet to the second packet processing module when the IP packet does not contain the protected IP address.

An example method includes receiving an IP packet, determining whether the IP packet is addressed to a protected IP address, determining whether the IP packet originated at a trusted source, routing the IP packet to a first packet processing module when the IP packet is addressed to the protected IP address and originated from the trusted source, and routing the IP packet to a second packet processing module when the IP packet not addressed to the protected IP address.

Another example method includes associating a protected IP address with a service to be protected against an Internet-originated attack, receiving an IP packet at a gateway of a distribution network, routing the IP packet to a distribution node of the distribution network when the IP packet is addressed to the protected IP address and is received from a trusted content provider, and blocking the IP packet at the gateway when the IP packet is addressed to the protected IP address and is not received from the trusted content provider.

An example system includes a distribution node to deliver IP packets to a customer premises, and a distribution network gateway to receive an IP packet, to determine whether the IP packet is from a trusted source, and to route the IP packet to the distribution node when at least one of the IP packet is addressed to a public IP address, or the IP packet is from the trusted source and addressed to a protected IP address.

An example residential gateway includes a transceiver to receive IP packets, a protected residential gateway to route IP packets having a protected IP address to a first network interface to support an IP television (IPTV) service, and a public residential gateway to receive IP packets having a public IP address from the protected residential gateway and to route the IP packets having the public IP address to a second network interface to support a non-IPTV service.

Certain examples are shown in the above-identified figures and described in detail below. In describing these examples, like or identical reference numbers are used to identify common or similar elements. Although the example systems and apparatus described herein include, among other components, software executed on hardware, such systems and apparatus are merely illustrative and should not be considered as limiting. Any or all of the disclosed components could be embodied exclusively in hardware, exclusively in software, exclusively in firmware or in any combination of hardware, firmware, and/or software.

Figure 2:
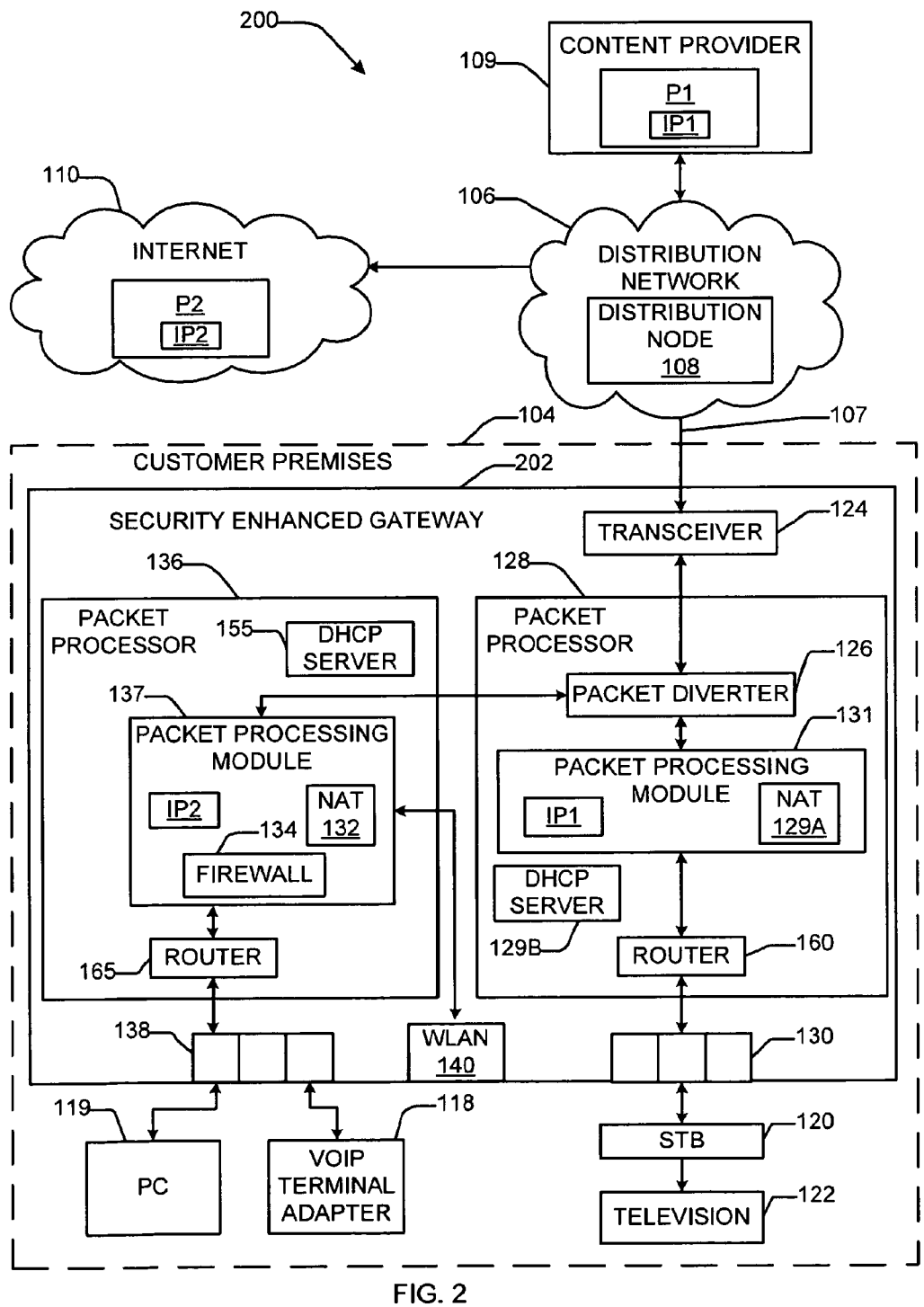

FIG. 1 illustrates an example access network 100 that may be used to, for example, provide triple-play services. To distribute data to any number and/or type(s) of customer premises, one of which is designated at reference numeral 104, the example access network of FIG. 1 includes a distribution network 106. The example distribution network 106 of FIG. 1 exchanges data with the example customer premises 104 via any type of distribution medium 107. Example types of distribution media 107 include, but are not limited to, a fiber optic cable, a telephone wire, and/or a coaxial cable. An example manner of implementing the example distribution networks 106 of FIGS. 1 and 2 is described below in connection with FIG. 3. Example machine-accessible instructions that may be executed to implement the example distribution networks 106 are described below in connection with FIGS. 5 and 6.

To exchange data with the example customer premises 104 via the example medium 107, the example distribution network 106 of FIG. 1 includes any number and/or type(s) of distribution nodes, one of which is designated at reference numeral 108. Example distribution nodes 108 include, but are not limited to, a digital subscriber line access multiplexer (DSLAM), a cable head end, and/or an optical line terminal. Media-based services may be provided by any number and/or type(s) of content providers, one of which is designated at reference numeral 109. Example services that may be provided by the content provider 109 include, but are not limited to, a voice over IP (VOIP) service and/or an IPTV service. In the illustrated example of FIG. 1, Internet access services are provided and/or implemented for the customer premises 104 by and/or via any number and/or type(s) of public and/or private networks, such as the Internet 110.

To couple the example customer premises 104 to the example distribution network 106, the example customer premises 104 of FIG. 1 includes a protected residential gateway 112. The example protected residential gateway 112 of FIG. 1 receives IP packets from the example distribution network 106, and distributes any or all of them to any number and/or type(s) of devices communicatively coupled to the example protected residential gateway 112, one of which is designated at reference numeral 120. The example protected residential gateway 112 is also communicatively coupled to a public residential gateway 114. As described below, the example protected residential gateway 112, based on an address contained in a received IP packet, routes the received IP packet either to the example public residential gateway 114 or to one or more devices communicatively coupled to the protected residential gateway 112 (e.g., the example device 120). The example public residential gateway 114 of FIG. 1 distributes IP packets that it receives to any number and/or type(s) of devices communicatively coupled to the public residential gateway 114, two of which are designated at reference numerals 118 and 119. Example devices 118-120 include, but are not limited to, a PC 119 that may be used for Internet access, a VoIP analog terminal adapter (ATA) 118 that may be used for a telephone service, and a set-top box (STB) 120 used to provide an IPTV service via a television 121.

To communicatively couple the example protected residential gateway 112 to the example distribution network 106, the example protected residential gateway 112 of FIG. 1 includes any type of transceiver 124. The example transceiver 124 of FIG. 1 communicatively couples the example protected residential gateway 112 to the distribution media 107 to receive IP packets and/or other data or information sent by the example distribution node 108. Example transceivers 124 include, but are not limited to, a digital subscriber line (DSL) modem, a cable modem and/or an optical network unit (ONU).

To communicatively couple the example devices 118 and 119 of FIG. 1 to the example public residential gateway 114, the example public residential gateway 114 of FIG. 1 includes any number and/or type(s) of network interfaces, two of which are designated at reference numerals 138 and 140. To communicatively couple the example STB 120 of FIG. 1 to the example protected residential gateway 112, the example public residential gateway 112 of FIG. 1 includes any number and/or type(s) of network interfaces, one of which is designated at reference numeral 130. The example network interfaces 130, 138, and 140 of FIG. 1 may be implemented in accordance with any past, present or future standard such as, any standard(s) from the Institute of Electrical and Electronics Engineers (IEEE) 802.x family of standards.

To communicatively couple the example protected residential gateway 112 to the example public residential gateway 114, the example residential gateways 112 and 114 of FIG. 1 include any number and/or type(s) of transceivers, two of which are depicted at reference numerals 132 and 134. The example transceiver 132 of FIG. 1 communicatively couples the protected residential gateway 112 to the example transceiver 134 of the public residential gateway 114. The example transceivers 132 and 134 may be implemented in accordance with any past, present or future standard, such as any standard (s) from the IEEE 802.x family of standards.

To perform packet processing, the example protected residential gateway 112 of FIG. 1 includes any type of a packet processor 128. The example packet processor 128 of FIG. 1 implements and/or integrates any number and/or type(s) of packet processing modules, one of which is designated at reference numeral 131, to perform and/or implement any number and/or type(s) of packet processing and/or routing functions such as, but not limited to, a network address translation (NAT) module 129A, a port address translation (PAT) module, a quality of service (QoS) module, a switching module, and/or a firewall. To facilitate the packet processing and/or routing, the example protected residential gateway 112 and/or the example packet processor 128 include and/or utilize any manner and/or type(s) of buffer(s) and/or packet memory(-ies) to buffer and/or store IP packets prior to, while, and/or subsequent to packet processing and/or routing functions. The example public residential gateway 114 of FIG. 1 includes a packet processor 136 and a packet processing module 137 to perform and/or implement similar and/or substantially identical functions to the example packet processor 128 and the example packet processing module 131.

Often, one or more public IP addresses are assigned to the customer premises 104. All such addresses are publicly routable. However, use of such public IP address leaves all of the example devices 112, 114 and 118-120 exposed to any number and/or type(s) of security risk(s) and/or Internet-based attack(s) An Internet-originated attack, such as a distributed denial of service (DDOS) attack, is capable of disrupting an IPTV service and/or a VOIP service. In some instances, a service disruption may be caused by a low-volume DDoS attack. Such attacks may not be detectible until an interruption occurs. While a residential gateway implementing sufficiently powerful QoS, a sufficiently powerful firewall, and/or sufficiently powerful filtering could protect a customer premises from such Internet-originated attacks, a sufficiently powerful residential gateway often is not feasible due to cost constraints and/or complexity. Further, a residential gateway implementing QoS, firewall and/or filtering functions may need to be updated on a frequent basis as new Internet-originated attack methods are developed. Unfortunately, such software update(s) of a residential gateway may, in some instances, introduce new vulnerabilities that may be exploited by an attacker via the Internet 110.

To enhance security within a residential network of the example customer premises 104, the example distribution network 106 of FIG. 1 assigns both a public IP address IP2 and a protected, secure, and/or private IP address IP1 to the customer premises 104. The public IP address IP2 is to be used with services, such as Internet access, which require a publicly-routable IP address. The protected IP address IP1 is associated with services, such as an IPTV service, which are desired to be additionally protected against disruptions due to, for example, Internet-originated attacks. The methods and apparatus described herein allow the protected IP address IP1 to be assigned by the content provider 109 and/or distribution network 106 so that the protected IP address IP1 is not publicly-accessible from the Internet 110 due to filtering implemented in the distribution node 108 and/or elsewhere within the example distribution network 106. Instead, the content provider 109 reserves use of the protected IP address IP1 to communications from trusted sources related to, for example, IPTV services.

Additionally or alternatively, the distribution network 106 may allow and/or authorize a trusted third-party content provider to provide a service and/or content via the Internet 110 to the protected IP address IP1, even if content provided by the same third-party content provider to the public IP address IP2 may be blocked. Thus, an IP packet containing the protected IP address IP1 and not originated by the example content provider 109, by the distribution node 108 and/or by a trusted source are presumed to be unauthorized and may be automatically discarded by the distribution network 106. Additionally or alternatively, the protected gateway 112 may discard such IP packets. Thus, the public IP address may be thought of as being associated with services delivered to a "public zone" of the customer premises 104, and the protected IP address may be thought of as being associated with services delivered to a "protected zone," a "private zone," and/or a "secure zone" of the customer premises 104.

The example public residential gateway 114 of FIG. 1 shares one or more public IP address IP2 across the example devices 118 and 119. The example packet processing module 137 implements a NAT module 132 or PAT module (not shown) to determine whether an IP packet addressed to the public IP address IP2 is to be routed to the device 118 or the device 119. Additionally, the example packet processing module 137 may implement a QoS module (not shown) to perform resource allocation functions to help assure that delay sensitive services, such as a VoIP service, maintain a certain level of performance. Because the public residential gateway 114 is associated with the public IP address IP2, the example public residential gateway 114 may be susceptible to Internet-originated attacks. To protect against Internet-originated attacks, the example packet processing module 137 implements a firewall 134 to prevent unauthorized access to the one or more devices 118 and 119 communicatively coupled to the public residential gateway 114.

The example protected residential gateway 112 of FIG. 1 shares the example protected IP address IP1 between the one or more devices 120 communicatively coupled to the protected residential gateway 112. Because the protected residential gateway 112 is associated with the protected IP address IP1, IP packets addressed to the protected IP address IP1 are assumed by the example packet processor 128 and/or the example packet processing module 131 to be from a trusted source. However, in some examples, the packet processor 128 also implements a firewall.

To distribute and/or route data within the customer premises 104 based on the protected IP address IP1 and the public IP address IP2, the example packet processor 128 of FIG. 1 includes a packet diverter 126. As each IP packet is received at the protected residential gateway 112, the example packet diverter 126 of FIG. 1 examines the destination IP address contained in the IP packet. If the received IP packet is addressed to the protected address IP1, the example packet diverter 126 routes the IP packet to the example packet processing module 131. For all other received IP packets, the packet diverter 126 routes the IP packets to the public residential gateway 114 via the example transceivers 132 and 134. The example packet diverter 126 makes the protected residential gateway 112 more immune and/or less exposed to Internet-originated attacks that target the IP address processing functionality of the residential gateway 112. Because IP packets addressed to the protected IP address IP1 will only be routed to the packet processing module 131 by the packet diverter 126 if they are from a trusted source, the example packet diverter 126 of FIG. 1 effectively extends the distribution network 106 into the protected zone of the protected residential gateway 112. Thus, the protected zone within the customer premises 104 becomes an extension of the distribution network 106 that is not accessible to untrusted sources outside the distribution network 106. Example machine-accessible instructions that may be executed to implement the example packet diverter 126 and/or, more generally, the example protected residential gateway 112 of FIG. 1 are described below in connection with FIGS. 4 and 7.

Consider an example IP packet PI transmitted by the example content provider 109 to the example customer premises 104. The example packet P1 of FIG. 1 includes as a destination address the protected IP address IP1 associated with the customer premises 104. When the example packet diverter 126 of FIG. 1 receives the IP packet P1, the packet diverter 126 obtains the destination IP address from the header of the received IP packet P1. For example, the packet diverter 126 can analyze one or more bits of an address field of the IP packet P1 to determine the destination address associated with the IP packet P1. Because the destination IP address of the example IP packet P1 of FIG. 1 is the protected IP address IP1, the packet diverter 126 routes the packet P1 to the packet processing module 131 associated with the protected IP address IP1. The packet processing module 131 further processes the received IP packet P1 using, for example, the NAT module 129A and/or a PAT module to route the IP packet P1 to the appropriate customer premises device 120. Because the packet processing module 131 is associated with the protected IP address IP1, the packet processing module 131 need not perform firewall calculations on the IP packet P1. However, further protection(s) may be implemented, if desired. Once the packet processing module 131 determines the destination device 120, the IP packet P1 is routed to the network interface 130 associated with the destination device 120. For example, if the IP packet P1 is associated with an IPTV service, the IP packet P1 may be routed to the network interface 130 associated with the example set-top box 120.

Consider another example IP packet P2 transmitted by a service located on the Internet 110. When the example packet diverter 126 of FIG. 1 receives the IP packet P2, which is addressed to the public IP address IP2, the IP packet P2 is routed by the example packet diverter 126 to the example packet processing module 137 via example transceivers 132 and 134. The second packet processing module 137 performs NAT, QoS, and/or firewall calculations on the received IP packet P2 prior to routing the IP packet P2 to the network interface 138 or 140 associated with the destination device 116, 118 associated with the received IP packet P2.

The example packet diverter 126 of FIG. 1 simply determines whether the IP packet is addressed to the protected IP address IP1. When a received IP packet is addressed to the protected IP address IP1, the received IP packet is routed to the example packet processing module 131, otherwise the IP packet is routed to the example transceiver 132. Because the example packet diverter 126 need only analyze the destination address bits of received IP packets, very little processing power is needed, thereby reducing susceptibility of the packet diverter 126 to Internet-originated attacks, such as processor cycle exhaustion attacks and/or malformed payload attacks. Further, because the protected IP address IP1 is reserved for communication between the content provider 109, a trusted third party content provider, and/or the distribution node 108 and the protected gateway 112 relating to protected services (e.g., IPTV), any IP packets using the protected IP address IP1 and not originating at the content provider 109, at a trusted third party content provider, or at the distribution node 108 are recognized as unauthorized (e.g., possibly part of a DDOS attack) and can be quickly discarded by the distribution network 106 without interrupting the protected services. Although this origination verification is performed at the distribution network 106, it may, additionally or alternatively, be performed at the packet diverter 126 and/or at a distribution gateway 304-306, as explained below in connection with FIG. 3.

The example packet processors 128 and/or 136 of FIG. 1 perform and/or implement any number and/or type(s) of initialization and/or configuration functions including, but not limited to, associating a port number with a particular device 118-120 connected to a network interface 130, 138, or 140, and/or associating IP addresses with the packet processors 128 and 136 and/or the transceivers 124 and 132. For example, the example packet processor 128 of FIG. 1 associates the protected IP address IP1 with the example packet processing module 131, associates the public IP address IP2 with the transceiver 132, and associates a port address with the STB 120.

To perform routing functions, the example packet processor 128 of FIG. 1 includes any type of a router, such as the example router 160 of FIG. 1. The example router 160 of FIG. 1 performs and/or implements any number and/or type(s) of routing and/or switching functions. To assign IP addresses, the example packet processor 128 of FIG. 1 includes a dynamic host control protocol (DHCP) server 129B to select and/or assign one or more IP addresses to the one or more devices 120 connected to the protected residential gateway 112. The example packet processor 136 of FIG. 1 likewise includes a router 165 and a DHCP server 155.

FIG. 2 illustrates another example manner of implementing an access network 200. Because many elements of the example access network 100 of FIG. 1 are identical to elements of the example access network 200 of FIG. 2, the descriptions of identical elements are not repeated here. Instead, identical elements are illustrated with identical reference numerals in FIGS. 1 and 2, and the interested reader is referred back to the descriptions presented above in connection with FIG. 1 for a complete description of like numbered elements.

In contrast to the illustrated example of FIG. 1, the example packet processors 128 and 136 of FIG. 2 are implemented within a single enclosure 202. Because the packet processors 128 and 136 are implemented within the same enclosure 202, the example transceivers 132 and 134 of FIG. 1 can be eliminated. The example transceiver 124, packet processor 136, and the network interfaces 130, 138 and 140 can be communicatively coupled to the example packet processor 128 using any number and/or type(s) of internal communication bus(es) and/or signal(s) 210 to reduce complexity and/or cost.

Additionally or alternatively, the example packet processors 128 and 136 of FIGS. 1 and 2 may be implemented using any number and/or type(s) of thread(s) and/or virtual machine(s) executed by a single processor. The example thread(s) and/or virtual machine(s) may be communicatively coupled using any manner and/or type(s) of data sharing techniques between thread(s) and/or virtual machine(s). For example, a first virtual machine implementing the example packet diverter 126 may receive an IP packet sent from the distribution node 108. The example packet diverter 126 examines the IP packet to determine the destination IP address of the received IP packet. If the destination of the IP packet is the protected IP address IP1, then the example packet diverter 126 routes the IP packet to a second virtual machine implementing the example packet processing module 131. However, if the destination IP address is not the protected IP address IP1, the packet diverter 126 routes and/or transfers the IP packet to a third virtual machine implementing the example packet processor 136.

While example manners of implementing the protected residential gateway 112 and public residential gateway 114 have been illustrated in FIGS. 1-2, one or more of the elements, blocks, and/or devices illustrated in FIGS. 1 and/or 2 may be combined, divided, re-arranged, omitted, eliminated, and/or implemented in any other way. Further, the example distribution node 108, the example transceivers 124, 132 and 134, the example packet diverter 126, the example packet processors 128 and 136, the example network interfaces 130, 138 and 140, the example packet processing modules 131 and 137, the example NAT modules 132 and 129A, the example DHCP servers 129B and 155, the example firewall 134, the example routers 160 and 165, and/or more generally, the example protected residential gateway 112 and/or the example public residential gateway 114 of FIGS. 1 and 2 may be implemented by hardware, software, firmware and/or any combination of hardware, software and/or firmware. Thus, for example, any or all of the example distribution node 108, the example transceivers 124, 132 and 134, the example packet diverter 126, the example packet processors 128 and 136, the example network interfaces 130, 138 and 140, the example packet processing modules 131 and 137, the example NAT modules 132 and 129A, the example DHCP servers 129B and 155, the example firewall 134, the example routers 160 and 165 and/or, more generally, the example protected residential gateway 112 and/or the example public residential gateway 114 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), discrete logic, hardware, firmware, etc. When any of the appended claims are read to cover a purely software and/or firmware implementation, at least one of the example distribution node 108, the example transceivers 124, 132 and 134, the example packet diverter 126, the example packet processors 128 and 136, the example network interfaces 130, 138 and 140, the example packet processing modules 131 and 137, the example NAT modules 132 and 129A, the example DHCP servers 129B and 155, the example firewall 134, the example routers 160 and 165, and/or more generally, the example protected residential gateway 112 and/or the example public residential gateway 114 of FIGS. 1 and 2 are hereby expressly defined to include a tangible medium such as a memory, a digital versatile disc (DVD), a compact disc (CD), etc. to store the software and/or firmware. Further still, the example protected residential gateway 112, and/or public residential gateway 114 of FIGS. 1 and 2 may include one or more elements, processes, and/or devices in addition to, or instead of, those illustrated in FIGS. 1 and 2, and/or may include more than one of any or all of the illustrated elements, processes, and devices.

Figure 3:
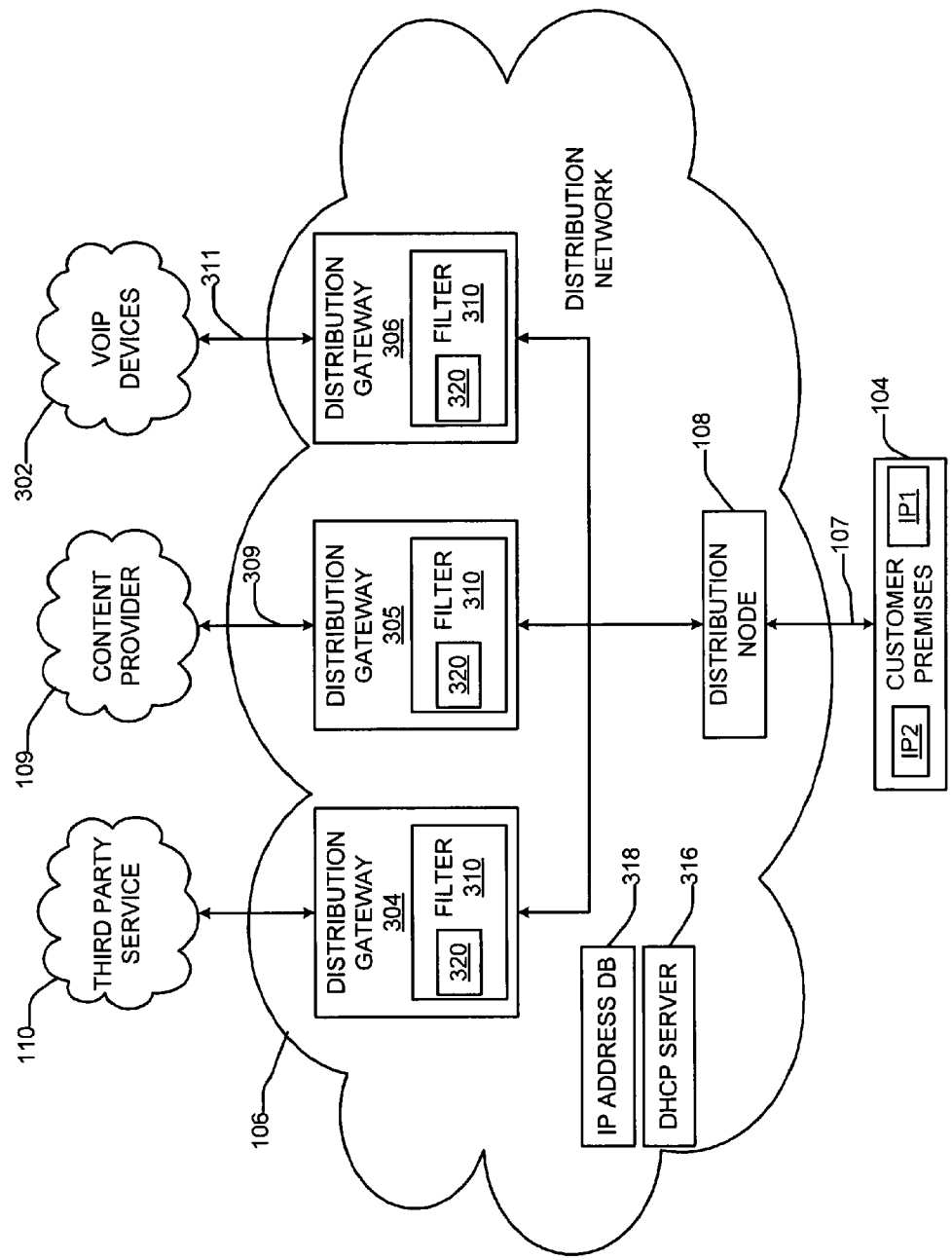
FIG. 3 illustrates an example manner of implementing the example distribution network of FIG. 1.

FIG. 3 illustrates an example manner of implementing the example distribution network 106 of FIGS. 1 and 2. As mentioned above, the example distribution network 106 exchanges data with the example customer premises 104 via the distribution medium 107, examples of which are discussed above in connection with FIG. 1. Example machine-accessible instructions that may be executed to implement the example distribution network 106 of FIGS. 1-3 are described below in connection with FIGS. 5 and 6.

To receive IP packets from sources, such as the third-party servers on the Internet 110, the example content provider 109, and/or a VoIP device 302, the example distribution network 106 of FIG. 3 includes any numbers and or type(s) of distribution gateways, three of which are designated at reference numerals 304, 305 and 306. Example distribution gateways 304-306 include, but are not limited to switches and/or routers. As packets are received at a distribution gateway 304-306, the destination IP address(es) of the received IP packets are examined to determine whether to route the received IP packets to the distribution node 108.

To determine whether to block received IP packets, each of the example distribution gateways 304-306 of FIG. 3 includes a filter 310. When a packet is received at a particular distribution gateway 304-306, the example filter 310 associated with that distribution gateway 304-306 examines the destination address contained in the received IP packet to determine whether to block the received IP packet. If the IP packet contains a protected IP address, such as the example protected IP address IP1 of FIG. 1, and if the IP packet is received from a trusted source and/or on a trusted interface, such as an interface 309 connecting to the content provider 109, the example filter 310 of FIG. 3 allows the received IP packet to be routed to the distribution node 108. If the IP packet is received on an un-trusted interface, such as an interface 311 connecting to a VoIP device 302 or a third-party server on the Internet 110 as determined, for instance, by examining the origination field of the IP packet, and if the received IP packet is addressed to the protected IP address IP1, the example filter 310 blocks and/or otherwise discards the IP packet. Packets addressed to a protected IP address but with a blank or unknown origination field are assumed to be from un-trusted sources and are blocked. However, if the received IP packet is addressed to a public IP address, such as the example IP address IP2 of FIG. 1, the example filter 310 routes the IP packet to the distribution node 108. The example filters 310 of FIG. 3 may implement spam filtering and/or other blocking for IP packets containing the public IP address, if desired.

To store a list of protected and/or public IP addresses, each of the example filters 310 of FIG. 3 includes an IP address database 320. The example IP address databases 320 of FIG. 3 may be implemented using any number and/or type(s) of data structures including, but not limited to, a delimited flat file and/or a structured query language (SQL) relational database. The example IP address databases 320 may be stored in any number and/or type(s) of memory(-ies) and/or memory device(s) such as, for example, a flash memory, a mass storage device, and/or a static or dynamic random access memory (RAM). The example databases 320 may contain predetermined blocks and/or lists of IP addresses. An example block represents a plurality of protected IP addresses that includes the example IP address IP1 assigned by the example distribution network 106 to the example customer premises 104. Another example block represents a plurality of public IP addresses that includes the example IP address IP2 assigned by the example distribution network 106 to the example customer premises 104. By using predetermined lists and/or blocks of IP addresses, the example databases 320 need not be updated as a customer premises are connected and/or disconnected from the distribution network 106. Alternatively and/or additionally, a filter 310 and/or an IP database 320 may be implemented within the example distribution node 108.

To assign IP addresses to the customer premises 104, the example distribution network 106 of FIG. 3 includes any number and/or type(s) of DHCP servers, one of which is designated at reference numeral 316. Using any number and/or type(s) of method(s) algorithm(s), rule(s) and/or logic, the example DHCP server 316 of FIG. 3 selects and/or assigns one or more protected IP addresses and one or more public IP addresses from a list and/or block of protected and/or public IP addresses to a particular customer premises that is being configured. The example DHCP server 316 then sends the assigned protected IP address(es) and the public IP address(es) to the customer premises 104. In some examples, the DHCP server 316 obtains an available IP address, such as the protected IP address IP1, from an IP address database 318. The example IP address database 318 contains blocks and/or lists of protected and/or public IP addresses that are mirrored by the databases 320.

In some examples, the example databases 320 of FIG. 3, additionally or alternatively, contain lists and/or records of trusted IP addresses, such as an IP address associated with the example content provider 109.

When a protected IP address is assigned to the customer premises 104, it is marked as used in the example protected IP database 318. The protected IP addresses stored in the protected IP database 318 can be accessed by the example distribution gateways 304-306 for use with the example filters 310. Additionally or alternatively, the protected IP addresses stored in the protected IP database 318 are pushed to the example distribution gateways 304-306. The example protected IP database 318 of FIG. 3 may be implemented using any number and/or type(s) of data structures and may be stored in any number and/or type(s) of memory(-ies) and/or memory device(s). The public and/or protected IP addresses may be static or dynamic.

The content provider 109, the third-party server via the Internet 110, and/or the example VoIP devices 302 may provide services to the public IP address IP2 associated with the example distribution node 108. In some examples, the example distribution node 108 examines the origination address field of IP packets to determine where each IP packet originated. If a received IP packet is addressed to the public IP address IP2 and was originated from a trusted source, such as the content provider 109, the distribution node 108 may modify the destination address of the IP packet to the protected IP address IP1 before forwarding the IP packet to the customer premises 104.

While example manners of implementing the example distribution network 106 of FIGS. 1 and 2 has been illustrated in FIG. 3, one or more of the elements, blocks and/or devices illustrated in FIGS. 1, 2 and/or 3 may be combined, divided, re-arranged, omitted, eliminated and/or implemented in any other way. Further, the example distribution gateways 304, 305, and 306, the example filters 310, the example DHCP server 316, the example protected IP database 318, the example IP address databases 320 and/or, more generally, the example distribution network 106 of FIGS. 1-3 may be implemented by hardware, software, firmware and/or any combination of hardware, software and/or firmware. Thus, for example, any or all of the example distribution gateways 304, 305, and 306, the example filters 310, the example DHCP server 316, the example protected IP database 318, the example IP address databases 320 and/or, more generally, the example distribution network 106 of FIGS. 1-3 could be implemented by one or more circuit(s), programmable processor(s), ASIC(s), PLD(s) and/or FPLD(s), discrete logic, hardware, firmware, etc. When any of the appended claims are read to cover a purely software and/or firmware implementation, at least one of the example distribution gateways 304, 305, and 306, the example filters 310, the example DHCP server 316, the example protected IP database 318, the example IP address databases 320 of FIG. 3 are hereby expressly defined to include a tangible medium such as a memory, a DVD, a CD, etc. to store the software and/or firmware. Further still, the example distribution network 106 of FIGS. 1-3 may include one or more elements, processes and/or devices in addition to, or instead of, those illustrated in FIGS. 1-3, and/or may include more than one of any or all of the illustrated elements, processes and devices.

Figure 4:
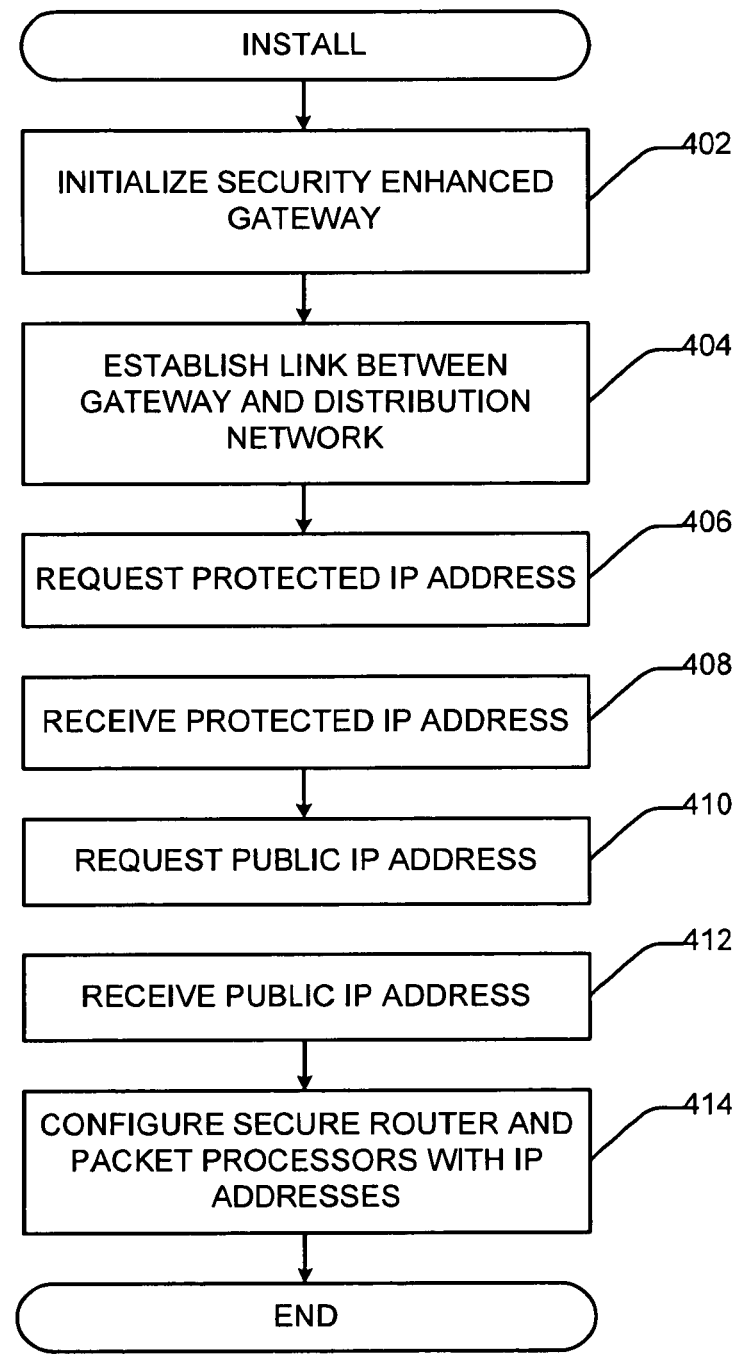
FIG. 4 is a flowchart representative of example machine-accessible instructions that may be executed to configure the example residential gateways of FIGS. 1 and 2.
Figure 5:
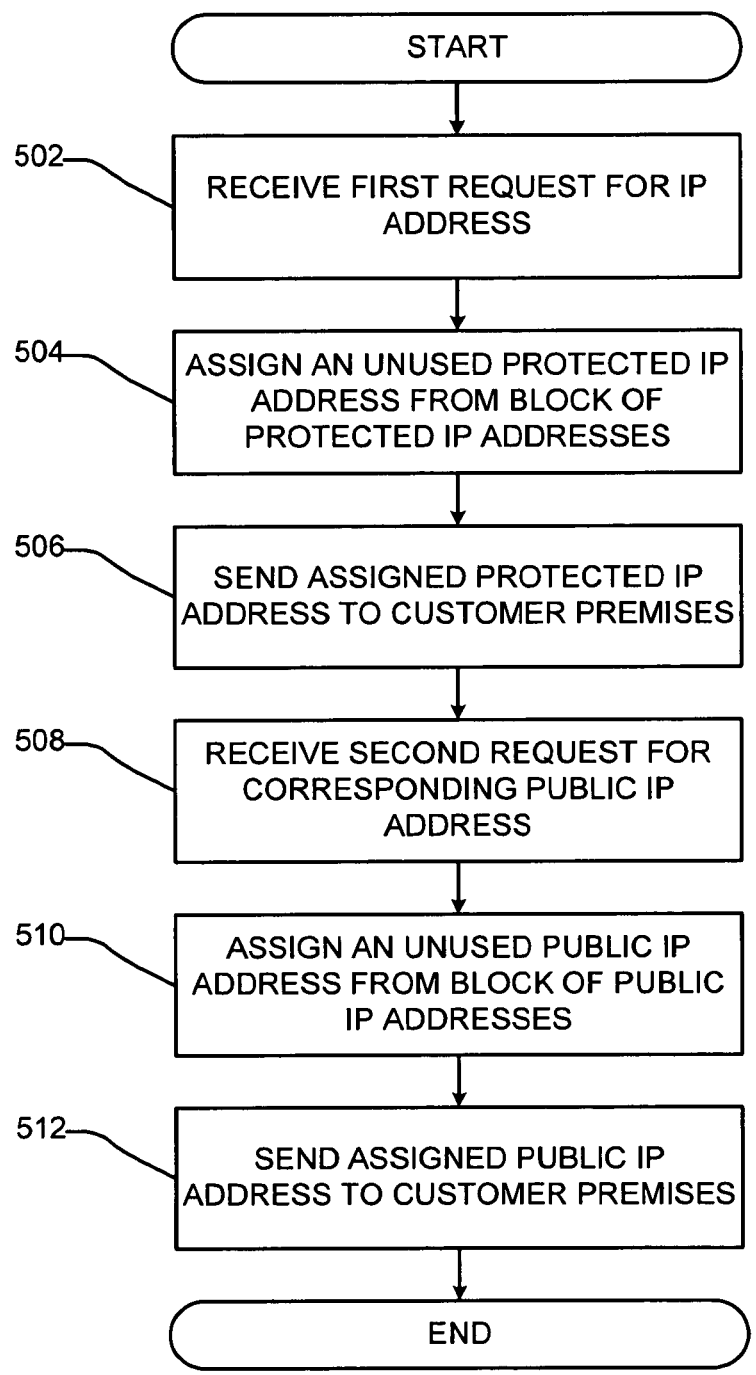
FIG. 5 is a flowchart representative of example machine-accessible instructions that may be executed to implement the example distribution networks of FIGS. 1 and 3.
Figure 6:
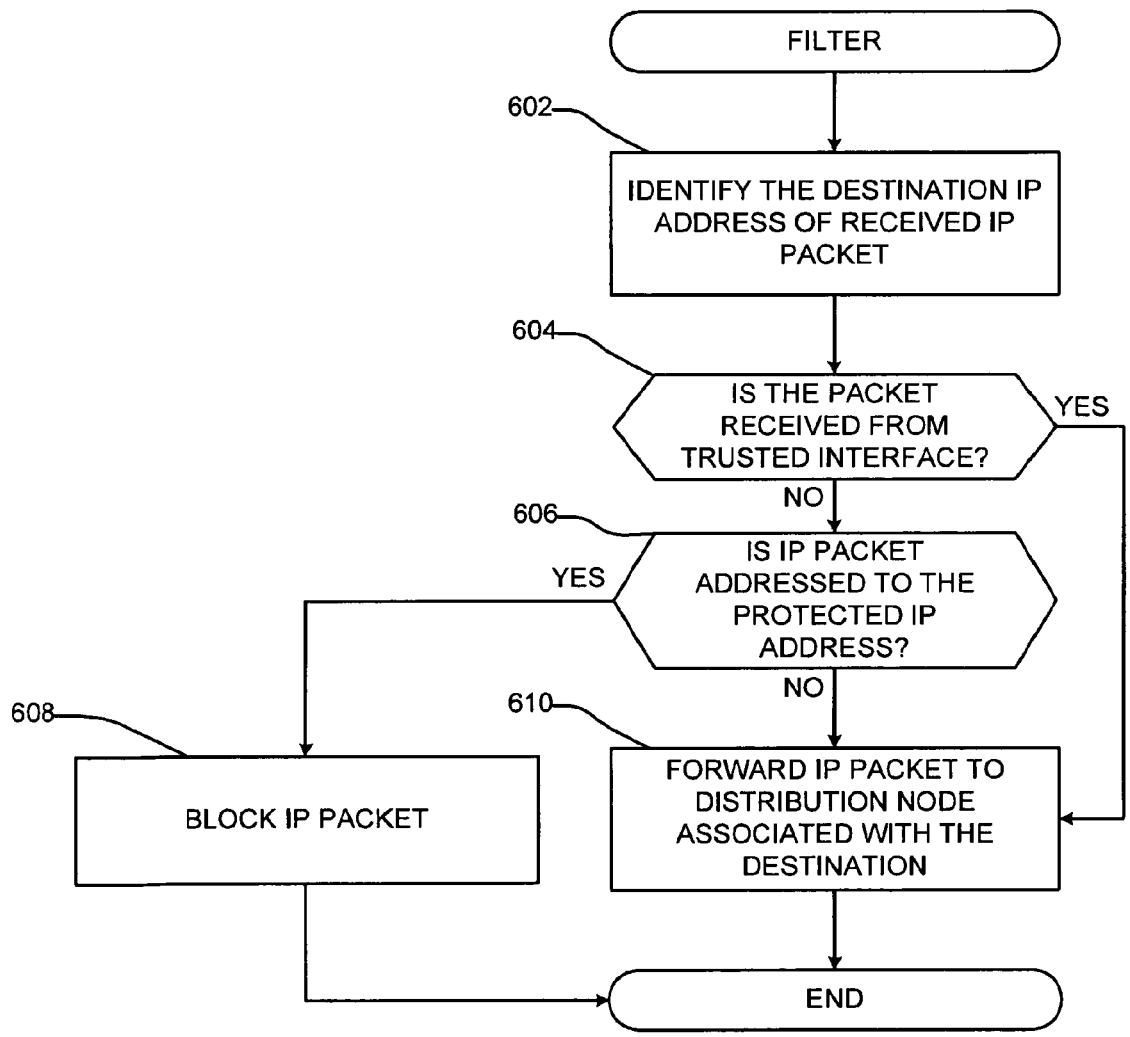
FIG. 6 is a flowchart representative of example machine-accessible instructions that may be executed to implement the example filters of FIG. 3.
Figure 7:
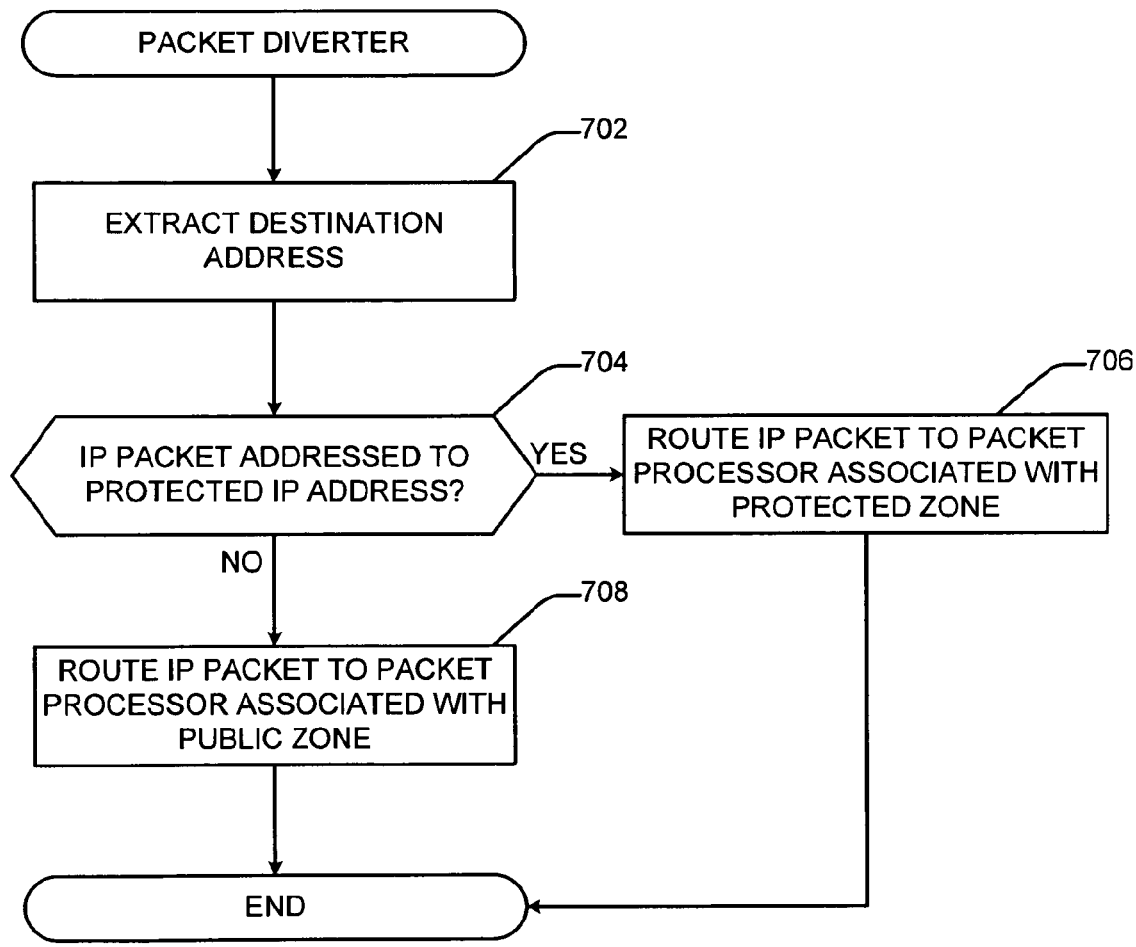
FIG. 7 is a flowchart representative of example machine-accessible instructions that may be executed to implement the example packet diverters of FIGS. 1 and 2.

FIGS. 4 and 7 are flowcharts representative of example machine-accessible instructions that may be executed to implement the example packet diverter 126, the example packet processors 128 and 136, the example protected residential gateway 112 and/or the example public residential gateway 114 of FIGS. 1 and 2. FIGS. 5 and 6 are flowcharts representative of example machine-accessible instructions that may be executed to implement the example distribution gateways 304-306, the example filters 310, the distribution node 108 and/or, more generally, the example distribution network 106 of FIGS. 1-3. In these examples, the operations represented by each flowchart may comprise one or more programs for execution by: (a) a processor, such as the processor P102 shown in the example processor system P100 discussed below in connection with FIG. 8, (b) a controller, and/or (c) any other suitable device(s). The one or more programs may be embodied in machine-accessible instructions stored on a tangible medium such as, for example, a flash memory, a CD read-only memory (CD-ROM), a floppy disk, a hard drive, a DVD, and/or a memory associated with the processor P102, but the entire program(s) and/or portions thereof could alternatively be executed by a device other than the processor P102. For example, the program(s) could be embodied in firmware and/or dedicated hardware (e.g., implemented by an ASIC, a PLD, a FPLD, discrete logic, etc.). For example, any or all of the example distribution node 108, the example transceivers 124, 132 and 134, the example packet diverter 126, the example packet processors 128 and 136, the example packet processing modules 131 and 137, the example network interfaces 130, 138 and 140, the example packet processing modules 131 and 137, the example NAT modules 132 and 129A, the example DHCP servers 129B, 155 and 316, the example firewall 134, the example routers 160 and 165, and/or more generally, the example protected residential gateway 112 and/or the example public residential gateway 114 of FIGS. 1 and 2 could be implemented by any combination of software, hardware, and/or firmware. Similarly, any or all of the example distribution gateways 304, 305, and 306, the example filters 310, the example protected IP database 318, the example IP address databases 320 and/or, more generally, the example distribution network 106 of FIGS. 1-3 could be implemented by any combination of software, hardware, and/or firmware. In addition, some or all of the operations represented by the example flowcharts of FIGS. 4-7 may be implemented manually. Further, although the example machine-accessible instructions of FIGS. 4-7 are described with reference to the flowcharts illustrated in FIGS. 4-7, many other techniques for implementing the example methods and apparatus described herein may alternatively be used. For example, the order of execution of the blocks may be changed, and/or some of the blocks described may be changed, eliminated, combined, and/or subdivided into multiple blocks.

The example machine-accessible instructions of FIG. 4 begin with the initialization of the example public residential gateway 112, the example protected residential gateway 114, and/or the example security enhanced residential gateway 202 at the customer premises 104 (block 402). The example protected residential gateway 112, the public residential gateway 114, and/or the security enhanced residential gateway 202 are then communicatively coupled to the distribution network 106, for example, via the example transceiver 124, to establish a link between the residential gateway 112, 202 and the distribution network 106 (block 404). The example packet processor 128 requests (block 406), and receives the protected IP address IP1 from the example distribution network 106 (block 408). The example packet processor 128 then requests (block 410), and receives the public IP address IP2 from the distribution network 106 (block 412). The example packet processor 128 configures the example packet diverter 126 and the example packet processing modules 131 and 137 with the received protected IP address IP1 and/or the received public IP address IP2 to enable routing of received IP packets to the example consumer devices 118-121 (block 414). Control then exits from the example machine-accessible instructions of FIG. 4.

The example machine-accessible instructions of FIG. 5 begin with the example DHCP server 316 receiving a request for a protected IP address to be assigned to the customer premises 104 (block 502). The example DHCP server 316 assigns the protected IP address IP1 to the customer premises 104 to facilitate the delivery of a first service from a trusted source (block 504), and sends the assigned protected IP address IP1 to the example customer premises 104 (block 506). When the example DHCP server receives a request for a public IP address (block 508), the DHCP server assigns the public IP address IP2 to the customer premises 104 to facilitate the delivery of a second service (block 510), and sends the assigned public IP address IP1 to the example customer premises 104 (block 5 14). The IP addresses IP1 and/or IP2 may be sent to the customer premises 104 via any number and/or any type(s) of methods to transfer an IP address, such as by mail, electronically by email, and/or set manually by an installer when the services are installed at the customer premises 104. Control then exits from the example machine-accessible instructions of FIG. 5.

The example machine-accessible instructions of FIG. 6 begin when any of the example filters 310 of FIG. 3 receives an IP packet. The filter 310 identifies the destination IP address contained in the received IP packet (block 602). For example, the filter 310 may examine bits within the IP packet that are associated with a destination IP address of the IP packet. The filter 310 determines whether the IP packet was received on a trusted interface, such as the interface connected to the example content provider 109 by, for example, comparing an address in an origination field of the IP packet to a list of trusted sources (block 604). If the received IP packet was received from a trusted source and/or on a trusted interface (block 604), the distribution gateway 304-306 associated with the filter 310 forwards the IP packet to the distribution node 108 associated with the destination IP address (block 610).

If the received IP packet was received from an untrusted source and/or on an un-trusted interface, such as an interface connected to the Internet 110 (block 604), the filter 310 determines whether the IP packet was addressed to the protected IP address IP1 (block 606). If the received IP packet was addressed to the protected IP address IP1 (block 606), the distribution gateway 304-306 does not forward and/or blocks the IP packet (block 608). Control then exits from the example machine-accessible instructions of FIG. 6.

Returning to block 606, if the received IP packet is not addressed to the protected IP address IP1, then the received IP packet is routed to the distribution node 108 associated with the destination IP address (block 610). Control then exits from the example machine-accessible instructions of FIG. 6.

The example machine-accessible instructions of FIG. 7 begin when the example packet diverter 126 receives an IP packet. The packet diverter 126 obtains the destination address from the received IP packet (block 702). If the IP packet was addressed to the protected IP address IP1 (block 704), the IP packet is routed by the packet diverter 126 to the packet processing module 131 associated with the protected, secure, and/or private zone of the customer premises 104 (block 706). In some examples, the packet diverter 126 may additionally verify that an IP packet addressed to the protected IP address IP1 was received from a trusted source. Control then exits from the example machine-accessible instructions of FIG. 7.

If the received IP packet was not addressed to the protected IP address IP1 (block 704), the packet diverter 126 routes the IP packet to the packet processing module 137 associated with the public zone and/or unsecured zone of the customer premises 104 (block 708). Control then exits from the example machine-accessible instructions of FIG. 7.

Figure 8:
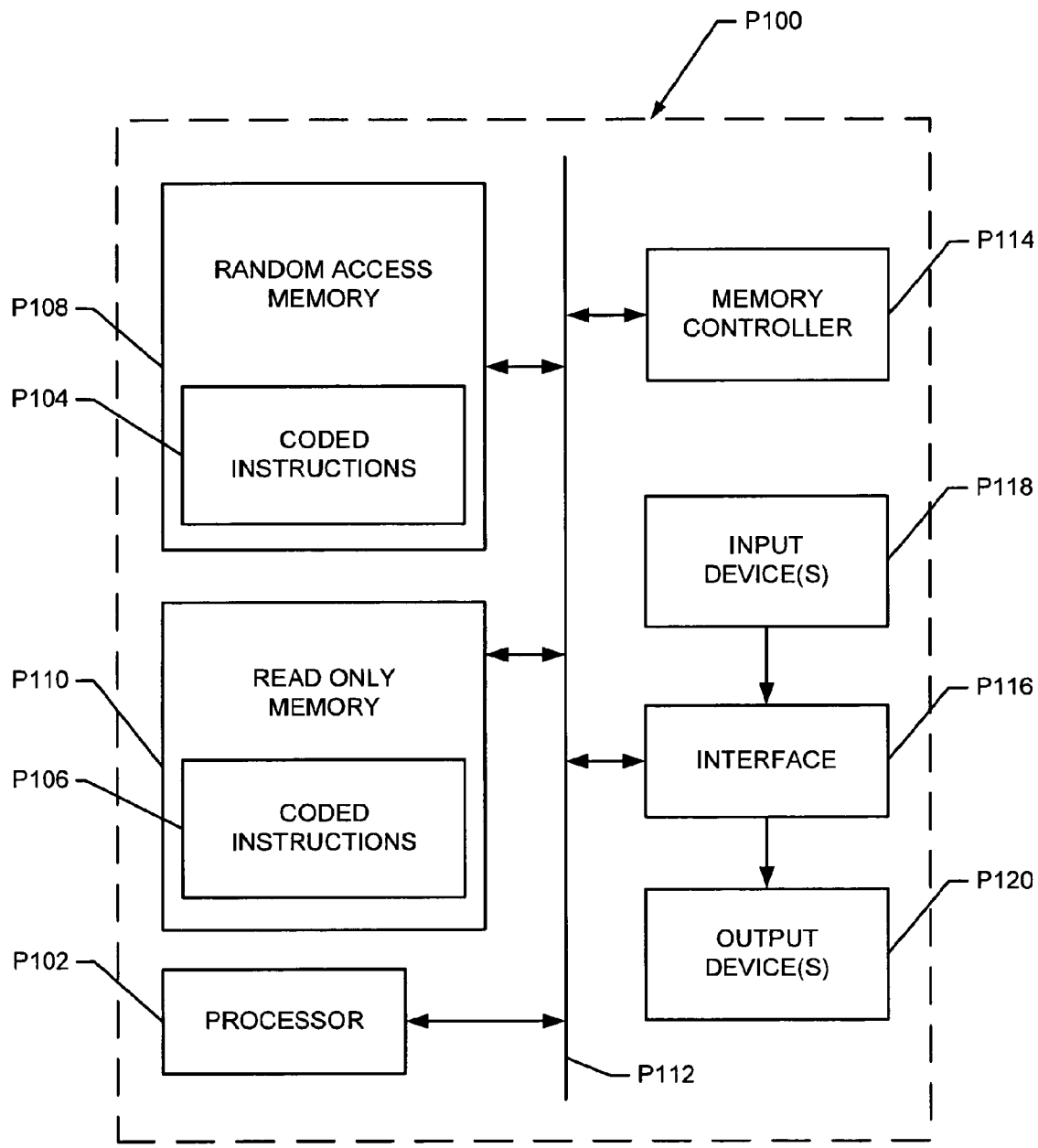
FIG. 8 is a block diagram of an example processor system that may be used to execute the example machine-accessible instructions of FIGS. 4-7, and/or to implement any of the example methods and apparatus disclosed herein.

FIG. 8 is a schematic diagram of an example processor platform P100 that may be used and/or programmed to implement all or a portion of any or all of the example machine-accessible instructions of FIGS. 4-7 to implement the apparatus and methods discussed above in connection with FIGS. 1-3. One or more general-purpose processors, microcontrollers, etc. can implement the example processor platform P100. The example processor platform P100 or a platform similar thereto, may be used to implement the example protected residential gateway 112, the example public residential gateway 114, and/or the example distribution gateways 304-306. The processor platform P100 of the example of FIG. 8 includes at least one general-purpose or special-purpose programmable processor P102. The processor P102 executes machine-accessible instructions P104 and/or P106 present in a, for example main memory of the processor P102 (e.g., within a RAM P108 and/or a ROM P110). The processor P102 may be any type of processing unit, such as a processor or a microcontroller. The processor P102 may implement, among other things, the example methods and apparatus described herein.

The processor P102 is in communication with the main memory (including a RAM P108 and/or a ROM P110) via a bus P112. The RAM P108 may be implemented by dynamic random-access memory (DRAM), synchronous dynamic random-access memory (SDRAM), and/or any other type of RAM device, and the ROM P110 may be implemented by flash memory and/or any other desired type(s) of memory device(s).

The processor platform P102 also includes an interface circuit P116. The interface circuit P116 may implement any number and/or type(s) of interface standard, such as an external memory interface, a serial network interface, a general purpose input/output, etc. One or more input devices P118 and one or more output devices P120 are connected to the interface circuit P116. The example devices P118 and P120 may be used to implement the example transceivers 124, 132, and/or 134, and/or the example network interfaces 130, 138, and/or 140.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method for use in delivering bundled services to a customer premises, comprising:
    determining, with a processor, whether an Internet protocol packet received at a gateway is addressed to a first packet processing module of the gateway assigned a protected Internet protocol address associated with a first one of the bundled services,
    wherein determining whether the Internet protocol packet is addressed to the first packet processing module comprises examining a field of the received Internet protocol packet to identify a destination Internet protocol address of the received Internet protocol packet;
    determining, with the processor, whether the Internet protocol packet originated at a trusted source;
    routing, with the processor, the Internet protocol packet to the first packet processing module of the gateway when the Internet protocol packet is addressed to the protected Internet protocol address and originated from the trusted source; and
    routing, with the processor, the Internet protocol packet to a second packet processing module of the gateway assigned a public Internet protocol address associated with a second one of the bundled services when the Internet protocol packet is not addressed to the protected Internet protocol address.

2. A method as defined in claim 1, further comprising blocking the Internet protocol packet when the Internet protocol packet does not originate from a trusted source and is addressed to the protected Internet protocol address.

3. A method as defined in claim 1, wherein routing the received Internet protocol packet to the second processing module further comprises routing the received Internet protocol packet to the second packet processing module when the Internet protocol packet contains the public Internet protocol address.

4. A tangible machine readable storage device comprising instructions that, when executed, cause a machine to perform operations comprising:
    determining whether an Internet protocol packet is addressed to a first packet processing module of a gateway assigned a protected Internet protocol address associated with a first one of bundled services, wherein determining whether the Internet protocol packet is addressed to the first packet processing module comprises examining a field of the Internet protocol packet to identify a destination Internet protocol address of the Internet protocol packet;
    determining whether the Internet protocol packet originated from a trusted source;
    routing the Internet protocol packet to the first packet processing module of the gateway when the Internet protocol packet is addressed to the protected Internet protocol address and originated from the trusted source; and
    routing the Internet protocol packet to a second packet processing module of the gateway assigned a public Internet protocol address associated with a second one of the bundled services when the Internet protocol packet is not addressed to the protected Internet protocol address.

5. A storage medium device as defined in claim 4, wherein routing the Internet protocol packet to the first packet processing module further comprises routing the Internet protocol packet to a set-top box when the Internet protocol packet is addressed to the protected Internet protocol address.

6. A storage device as defined in claim 4, wherein routing the received Internet protocol packet to the second packet processing module further comprises routing the received Internet protocol packet to the second packet processing module when the Internet protocol packet contains the public Internet protocol address.

7. A gateway, comprising:
    a first packet processing module assigned a protected Internet protocol address associated with a first bundled service;

a second packet processing module assigned a public Internet protocol address associated with a second bundled service;

a memory comprising machine readable instructions; and a processor to execute the instructions to perform operations comprising:

determining whether an Internet protocol packet is addressed to the first packet processing module, wherein determining whether the Internet protocol packet is addressed to the first packet processing module comprises examining a field of the Internet protocol packet to identify a destination Internet protocol address of the Internet protocol packet;

determining whether the Internet protocol packet originated at a trusted source;

routing the Internet protocol packet to the first packet processing module when the Internet protocol packet is addressed to the protected Internet protocol address and originated from the trusted source; and routing the Internet protocol packet to the second packet processing module when the Internet protocol packet is not addressed to the protected Internet protocol address.

8. A gateway as defined in claim 7, wherein the gateway comprises a residential gateway.

9. A gateway as defined in claim 7, further comprising a transceiver to receive the Internet protocol packet.

10. A gateway as defined in claim 7, wherein the first packet processing module comprises a first packet processor, and the second packet processing module comprises a second packet processor.

11. A gateway as defined in claim 7, wherein the protected Internet protocol address is publicly inaccessible to protect the gateway against Internet-originated attacks associated with the second bundled service.

12. A gateway as defined in claim 7, wherein the first bundled service is an Internet protocol television service.

13. A gateway as defined in claim 7, wherein routing the received Internet protocol packet to the second processing module further comprises routing the received Internet protocol packet to the second packet processing module when the Internet protocol packet contains the public Internet protocol address.

14. A gateway as defined in claim 7, further comprising a housing, wherein the first and second packet processing modules are located in the housing.

15. A gateway as defined in claim 7, wherein the first packet processing module does not include a firewall, and the second packet processing module includes a firewall.

16. A gateway as defined in claim 7, wherein the operations further comprise blocking the Internet protocol packet when the Internet protocol packet includes the protected IP address and does not originate at the trusted source.

17. A gateway as defined in claim 7, wherein at least one of the first and second packet processing modules is to implement at least one of a network address translation module, a quality of service module, or a firewall.

18. A gateway as defined in claim 7, wherein the first packet processing module and the second packet processing module are located at a same customer premises.

19. A gateway as defined in claim 7, wherein the operations further comprise:

executing a first virtual machine to implement the first packet processing module; and executing a second virtual machine to implement the second packet processing module.

\* \* \* \* \*